United States Patent [19]
Leonard

[11] Patent Number: 5,306,375
[45] Date of Patent: Apr. 26, 1994

[54] CONTOUR COMPENSATING PEELER PLATE

[75] Inventor: Robin G. Leonard, Maple Plain, Minn.

[73] Assignee: Accraply, Inc., Minnetonka, Minn.

[21] Appl. No.: 77,710

[22] Filed: Jun. 15, 1993

Related U.S. Application Data

[63] Continuation of Ser. No. 794,116, Nov. 15, 1991, abandoned, which is a continuation-in-part of Ser. No. 452,773, Dec. 19, 1989, abandoned.

[51] Int. Cl.⁵ .................. B32B 31/00; B44C 1/16
[52] U.S. Cl. .................. 156/249; 156/361; 156/541; 156/542; 156/DIG. 42; 156/DIG. 45
[58] Field of Search ....... 156/361, 541, 556, DIG. 33, 156/DIG. 45, 542, DIG. 42, 249; 269/59

[56] References Cited

U.S. PATENT DOCUMENTS

| | | | |
|---|---|---|---|
| 4,080,239 | 3/1978 | Real et al. | 156/542 X |
| 4,239,569 | 12/1980 | Harvey | 156/542 X |
| 4,321,103 | 3/1982 | Lindstrom et al. | 156/541 X |
| 4,427,484 | 1/1984 | Cameron, Jr. et al. | 156/542 X |
| 4,502,910 | 3/1985 | Voltmer et al. | 156/542 X |
| 4,840,694 | 6/1989 | Brookman et al. | 156/541 X |
| 4,855,005 | 8/1989 | Jodrey | 156/542 X |
| 5,133,827 | 7/1992 | Raterman | 156/361 |
| 5,188,696 | 2/1993 | Good, Jr. | 156/542 X |

*Primary Examiner*—David A. Simmons
*Assistant Examiner*—Mark A. Osele
*Attorney, Agent, or Firm*—Oldham, Oldham & Wilson Co

[57] ABSTRACT

An improved device and method for applying labels to contoured product panels. More specifically, the present invention incorporates a rotating cam which is cut to profile the product panel to be labeled and guides the peeler plate along and in close proximity with the product's surface without actually contacting it. This allows better control of the label application and subsequent wiping than was previously possible. Additionally, this device can label contoured surfaces not previously possible using conventional methods.

16 Claims, 4 Drawing Sheets

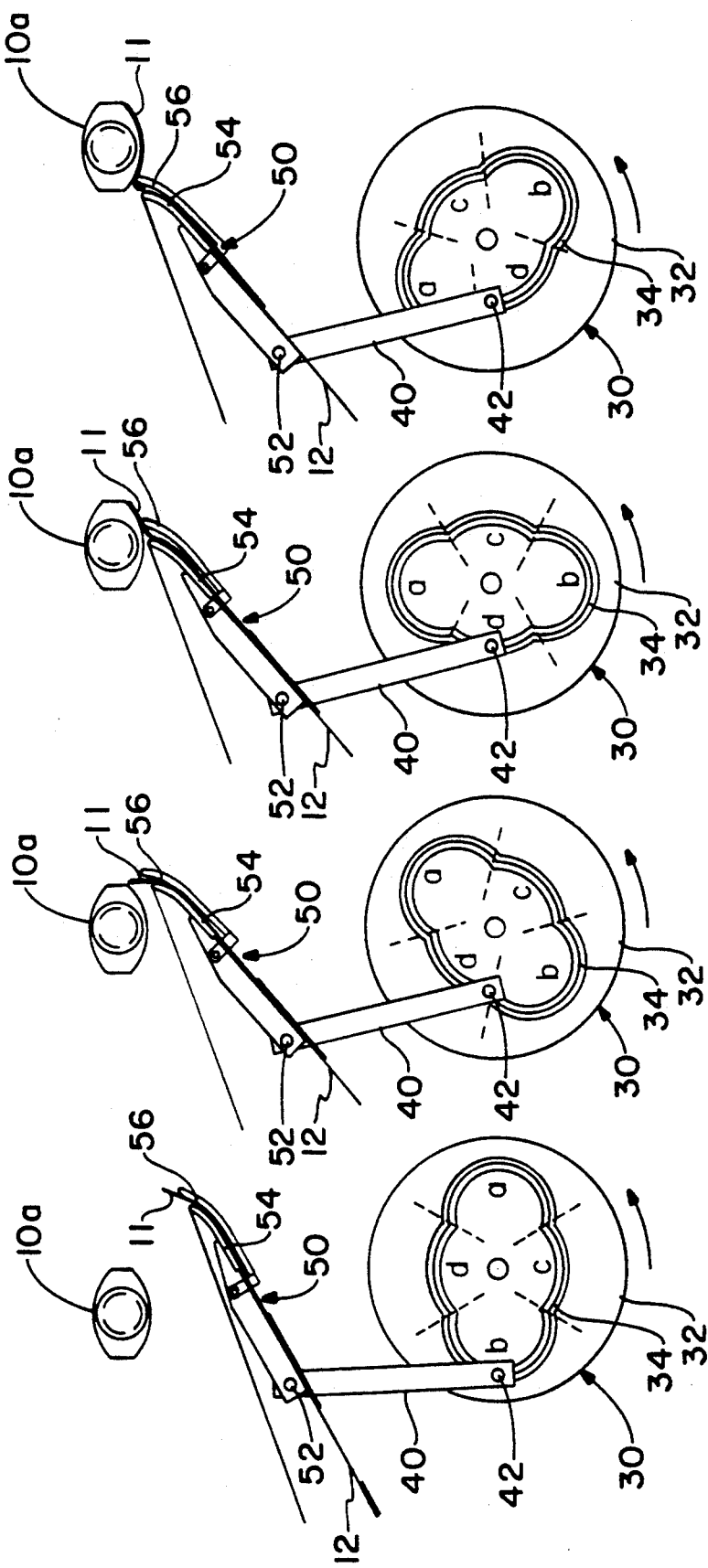

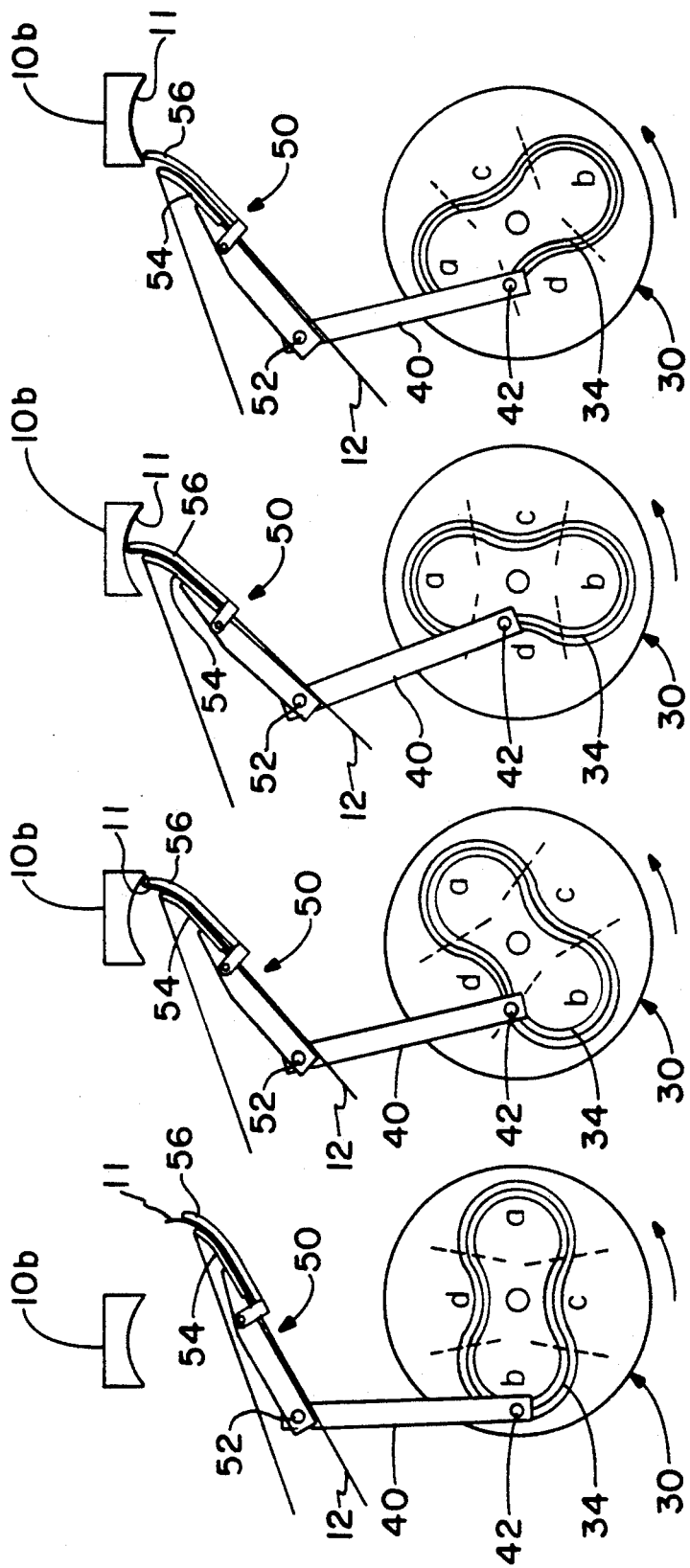

CONTOUR COMPENSATING PEELER PLATE

This is a continuation of copending application Ser. No. 07/794,116 filed on Nov. 15, 1991 now abandoned which is a continuation-in-part of copending application Ser. No. 07/452,773 filed on Dec. 19, 1989 now abandoned.

TECHNICAL FIELD

The present invention, generally, relates to an improved device and method for applying pressure sensitive adhesive labels to substrates or product containers. More specifically, this device relates to an improved device and method for applying transparent or opaque pressure sensitive adhesive labels more efficiently and with fewer imperfections than previously possible, to a vertically oriented convex or concave panel conveyed past a labeling site.

BACKGROUND OF THE INVENTION

Systems for labeling products in the production process are well known. Generally, such labeling systems utilize a conveyor which transports vertically placed products through the system. As the products approach the labeler, a low limit control device detects and meters the presence of the product to determine whether enough product is present to allow passage into the labeler. As the products enter the labeler, synchronized infeed timing screws position, space, and meter the products on the conveyor for subsequent labeling.

An overhead stabilizer assumes control of the product as it leaves the infeed timing screws. This stabilizer functions to hold the product securely against the conveyor as the product passes through the labeler.

The product passes two electronic sensor devices as it approaches the applicator heads. A product sensor is responsible for detecting the presence of the product and subsequently initiating dispensing of a label. A label sensor is responsible for detecting the movement of the label and web during dispensing and signaling a brake to stop dispensing.

A pressure sensitive label is applied to the product or substrate using an applicator head system. A web of label material is unwound from the supply roll, guided across an idler roll and down an apron plate to the peeler plate. The peeler plate guides the web to the peeler tip. The peeler tip peels the label from the web as it is pulled around the tip toward a pressure roller/knurled roller assembly. These applicator heads are operated by a motorized indexing system.

A tension wiper holds the label flat as it passes under the label sensor. The label wiper provides the initial touch of the label to the product, is mounted to the peeler plate and extends past the tip in order to wipe the leading edge of the label to the product as it passes the peeler tip.

The pressure roller/knurled roller assembly is responsible for pulling the label web from the supply roll to the peeler tip, as well as pulling the used web liner from the tip to the rewind roll. A rewind roll serves to take up the used web material. Finally, the labeled product is passed through a label wiper roller system which contacts the label and ensures that the label is securely affixed to the product.

The prior art devices and methods of labeling have several problems and disadvantages. Frequently, the label applied to the product is wrinkled or contains bubbles between the product and the label. Additionally, the label wiper rollers in some instances scratch the label. These imperfections yield undesirable results, and render the product unfit for its intended use, thereby resulting in product waste.

Prior art labeling machines require the peeler plates to actually contact the product. In the prior art methods the product is pushed past the applicator in such a way that the motion of the product moves the peeler around the product. The peeler arm and label wiper are biased or urged into actual contact with the product panel. Oftentimes, the initial contact of the product into the peeler arm causes an exaggerated movement of the peeler arm away from the product as the label dispensing begins, resulting in the aforementioned wrinkling and bubbling. To achieve this contact, the overhead stabilizer must apply a substantial amount of pressure to the product so that the product does not move during this process. The pressure from the overhead stabilizer can cause distortion of the product shape in this situation, which may then result in distortion of the applied label.

Before development of the present invention, labeling machines were not capable of effectively and practically labeling a concave panel surface. Additionally, such labeling machines are limited in the materials which can be used in the labels while still achieving acceptable appearance.

The present invention addresses all of the above problems and disadvantages by providing a peeler plate which, because it is cam driven, comes in close proximity to the product when applying the label, without actually contacting the product. This allows the smooth application of the label to the product without using the motion of the product itself to achieve this result. Therefore, fewer wrinkles and bubbles occur during labeling and less pressure is applied to the product by the overhead stabilizer. The present invention also eliminates the need for a label wiper roller assembly. Individual cams are developed to mirror the contour of specific products thereby enabling the device to apply labels to a variety of contoured panel surfaces.

SUMMARY

The present invention relates to an improved device and method for applying pressure sensitive adhesive labels to products in a conveyored system. More specifically, the present invention mechanically adjusts the position of the applicator peeler plate in relation to the contour of a concave or convex panel on a substrate or product panel, rather than relying on the application of force from the product against the peeler plate. This invention achieves such adjustment and compensation by pivotally driving the peeler plate using a cam which is cut to match the profile of the corresponding product panel to be labeled. The cam is driven in time with the metering system.

When labeling a convex panel the rotating cam moves the peeler such that it remains in close proximity to the product panel without coming in contact with it.

It is an object of the present invention to provide an improved device for labeling product panels which does so with fewer imperfections than previously possible.

It is an object of the present invention to provide an improved device for labeling product panels which is capable of labeling concave panels.

It is an object of the present invention to provide an improved device for labeling product panels which eliminates the need for label wiper roller.

It is an object of this present invention to provide an improved device for labeling products which allows the operator to use a greater variety of pressure sensitive label materials.

It is an object of the present invention to provide an improved device for labeling product panels which can be retrofitted onto existing labeling devices.

It is an object of the present invention to provide an improved device for labeling product panels which allow an overhead stabilizer to apply less pressure to the product.

BRIEF DESCRIPTION OF THE DRAWINGS

FIG. 3a shows the initial step in the labeling of a convex product panel by an improved labeling device with a contour compensating peeler plate.

FIG. 3b shows a further step in the labeling of a convex product panel by an improved labeling device with a contour compensating peeler plate.

FIG. 3c shows a further step in the labeling of convex product panel by an improved labeling device with a contour compensating peeler plate.

FIG. 3d shows a still further step in the labeling of a convex product panel by an improved labeling device with a contour compensating peeler plate.

FIG. 4a shows the initial step in the labeling of a concave product panel by an improved device with a contour compensating peeler plate.

FIG. 4b shows a further step in the labeling of a convex product panel by an improved labeling device with a contour compensating peeler plate.

FIG. 4c shows a further step in the labeling of a convex product panel by an improved labeling device with a contour compensating peeler plate.

FIG. 4d shows a further step in the labeling of a convex product panel by an improved labeling device with a contour compensating peeler plate.

DETAILED DESCRIPTION

Figure 1:
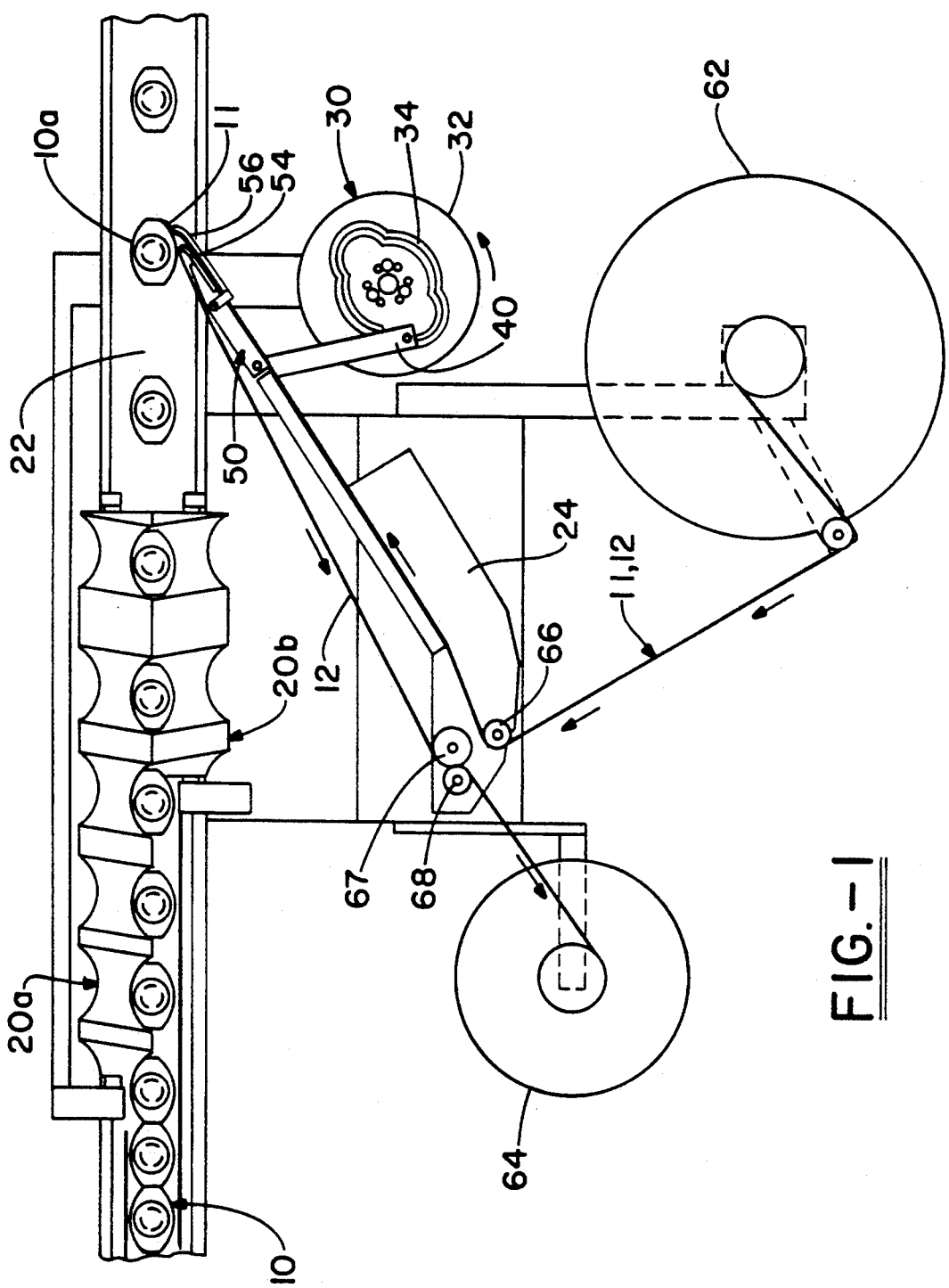
FIG. 1 is a top plan view of the improved labeling device with a contour compensating peeler plate. The overhead stabilizer has been omitted for the purposes of clarity in illustration.

Now with reference to the invention illustrated in the drawings and looking particularly at FIG. 1, the figures shows an overall view of the present invention, illustrating an improved labeling device with a contour compensating peeler plate 54.

As with the prior art labeling devices, the product 10 moves along a conveyor 22 and is taken up by two synchronized infeed timing screws 20a and 20b. These infeed timing screws 20a and 20b position the product 10 for the labeling process. As the product 10 leaves the infeed timing screws 20a and 20b, the product 10 is contacted on its upper surface by an overhead stabilizer (not shown). The overhead stabilizer applies just enough pressure to each product 10 to ensure that the product will not move during the label application process but which will not deform the product.

Figure 2A:
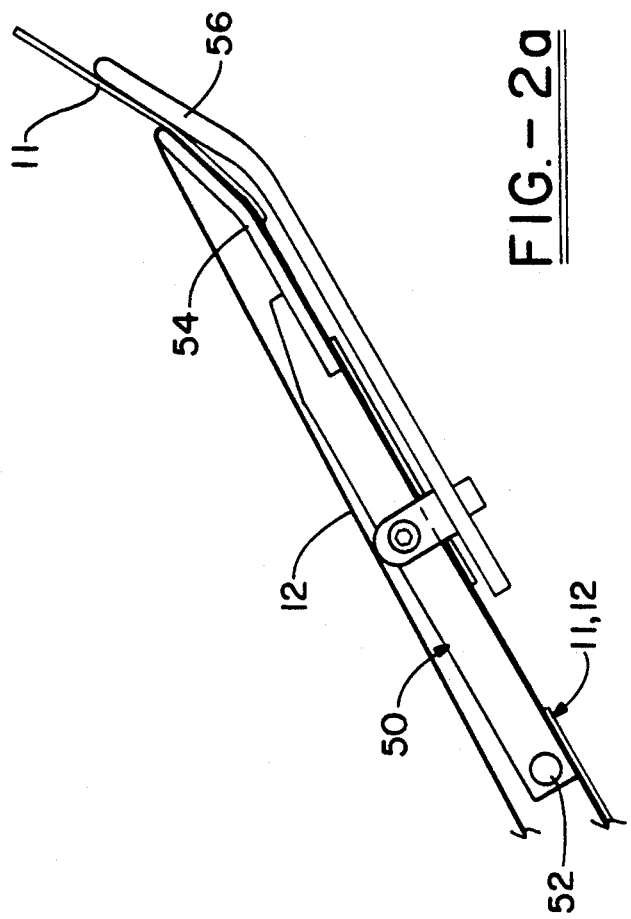
FIG. 2a is a top view of the peeler plate utilized on the improved labeling device illustrated in FIG. 1 and 2.

The label applicator head, shown generally as 50, is well known in the art. The labeling process, illustrated in FIG. 1 shows a web of label-containing material 12, pulled from supply roll 62, around idler roll 66 and towards the tip of peeler plate 54. The label 11 is separated from the web 12 at the tip of the peeler plate 54 and is applied to the product 10. The sharp deflection of the label bearing web around the tip of the peeler plate 54 as shown in FIG. 2a causes the web 12 to peel away from the pressure sensitive label thereby exposing the adhesive coated side of label 11. The used web 12 is pulled away from the peeler plate 54 by the knurled roller 68/pressure roller 67 assembly and collected on rewind roller 64 thus applying a tension to the label during application.

In one prior art device, the applicator head is moved into contact with the product for applying the label. Labeling is achieved by directing the product past the peeler plate which is essentially biased or urged against the product. The progress of the product along the conveyor virtually drags the peeler plate along the surface of the product panel immediately behind the label. This method results in scratched labels, or labels with bubbles, wrinkles, or non-contacted edges.

Figure 2:
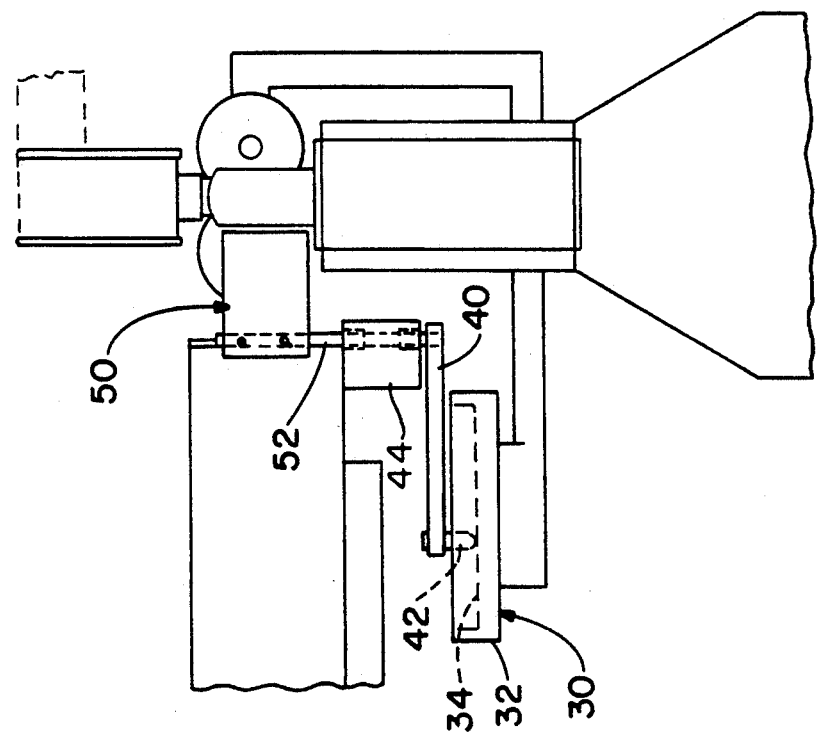
FIG. 2 is a partial front view of the labeling device illustrated in FIG. 1.

The present invention, as shown in FIGS. 1 and 2, incorporates a cam system 30 to move the applicator head 50 in continually close proximity with the product 10 without peeler plate 54 actually contacting the product panel. The cam system 30 is shown as a cam track 34 mounted on a base 32. The cam 30 is rotated in time with the infeed timing screws 20a and 20b by means well known in the art. The cam 30 is illustrated as mounted and rotating horizontally, but a vertically mounted cam is contemplated in certain other labeling devices or circumstances.

The cam track 34 has a generally oval shape. The cam 30 illustrated in the drawings is designed such that one complete rotation around the cam track 34 is capable of labeling two products. However, the design of the cam could be altered in size or shape to label various numbers of products 10 during each rotation. However, it is desirable that the cam track form a closed loop. For purposes of illustration and explanation and as shown in FIGS. 3a–d and 4a–d, the cam track 34 is divided into four sections. Sections a and b are essentially mirror images of one another and serve to reset the applicator head 50 for the next label application. Sections c and d are also mirror images of one another, but these sections serve to guide the applicator system along the contoured surface of the product. Sections c and d essentially and proportionally correspond to the contour of the product panel. Some minor adjustments in the dimensions are necessary in order to compensate for the movement of the product 10.

The cam 30 is operatively connected to an extension arm 40 which is in turn connected to an applicator rod 52 attached to the applicator head 50. One end of the extension arm 40 is connected to the cam track 34 by a cam follower 42 which is well known in the art. The cam follower 42 is essentially a roller bearing device which is slidably and pivotally engaged into the cam track 34 so as to permit movement along the track 34 only in the direction of the movement of the cam. The second end of the extension arm 40 is connected to the applicator rod 52 by an adjustable securing means 44. This adjustable securing means 44 is contemplated as any means known in the art which accomplishes a secure and immovable connection when tightened. However, it is desirable to allow adjustment during set up or changing of cams 30. A standard applicator head 50 is attached to the applicator rod 52. A bearing or mounting 55 maintains rod 52 in a stationary but rotatable position.

For operation, a cam is selected or made which corresponds to the contour of the product panel as previously discussed. Product panels with concave, convex or variably contoured surfaces can be labeled after developing and installing a corresponding cam 30 onto the cam base 32.

FIGS. 3a-d illustrate a sequence of steps used to label a convex product. In FIG. 3a, the cam 30 is resetting the applicator head 50 for labeling. As the product passes along the conveyor 22, the cam 30 is sized and timed to rotatably position the peeler plate 54 in close proximity to the leading edge of the product 10a.

FIG. 3b shows the product 10a meeting but not contacting the peeler plate 54. The cam follower 42 is in the initial recession of section d of the cam track 32. This recession corresponds to the leading edge of convex product 10a. A product sensor detects the product in this position and initiates the label dispensing. Such sensors are known in the art. The label is separated from the web material 12 at the tip of the peeler plate 54. Although the peeler plate 54 does not contact the product 10a, the label wiper 56 does make contact with product 10a to ensure the label's initial tack.

As the product moves along the conveyor 22, the cam 30 turns in time with linear progression of product 10, such that the cam follower 42 moves through the cam track 34, maintaining the peeler plate 54 in close proximity but not actual contact with the product 10a. The movement of cam follower 42 along the cam 30 cause movement of extension arm 40. The movement of the extension arm 40 in turn causes the pivotal movement of application rod 52. The pivotal movement of application rod 52 results in the movement of peeler plate 54 during label application, mirroring the contour of the product panel. The cam 30 allows the peeler plate 54 to maintain a continuous tension on label 11 between the leading edge of the label attached to the product and the trailing edge still adhered to the web. Similarly, the cam 30 serves to allow the label wiper 56 to impart a tension to the label as it parallels the surface of the product panel urging the label into contact with the panel.

FIG. 3c illustrates a midpoint in the labeling process wherein the cam follower 42 is in approximately the same position in cam track 34, section d, as the peeler plate 54 is in relation to product 10a.

In FIG. 3d, the cam 30 continues its counterclockwise rotation so as to advance cam follower 42 in cam track 34, continually keeping peeler plate 54 in close proximity with the product 10a. The cam follower 42 is shown in a second groove which corresponds to the back edge of product 10a. The label wiper 56 contacts the trailing edge of the label to ensure a final tack on the product 10a. Such label wipers are well known in the art.

As the cam 30 continues to rotate, the cam follower 42 travels through the area of cam track 34 shown as section a in the drawings. This causes the peeler plate 54 of applicator head 50 to rotatably move away from the conveyor 22 and reset into a position to label a subsequent product 10a. The above described labeling sequence is repeated as the cam follower enters section c of cam track 34.

FIGS. 4a-d illustrate a sequence of steps used to label a concave product surface 10b. The cam 30 is designed similar to the cam 30 in FIG. 3a-d in that sections a and b serve to reset the applicator head 50 in position for labeling while sections c and d approximately duplicate the contour of the product surface. Again, the peeler plate 54 remains in close proximity with the product surface throughout the label application. The label wiper 56 lightly contacts the labeled surface to ensure uniform contact.

FIG. 1 shows label wiper rollers 60 which are provided to contact the labeled surface of the product for further securing the label to the product. However, the present invention eliminates the need for such rollers, making them optional.

While in accordance with the patent statutes the best mode and preferred embodiment of the invention has been described, it is to be understood that the invention is not limited thereto, but rather is to be measured by the scope and spirit of the appended claims.

What is claimed is:

1. A device for applying pressure sensitive labels having leading and terminating edges to a contoured panel at a labeling site comprising:
   a means for conveying said contoured panels past a labeling site;
   a peeler plate assembly having a longitudinal axis, first and second ends and a peeler tip at said second end of said peeler plate assembly;
   a label wiper fixedly attached to said peeler plate and essentially parallel thereto, said label wiper having a first and a second end portion, said second end portion extending beyond said peeler tip of said peeler plate and angled inward toward the longitudinal axis of said peeler plate so as to direct said labels into contact with said contoured panel, said pressure sensitive labels passing between said peeler plate and said label wiper;
   a single rotating closed loop cam means controlling the speed and movement of said peeler plate assembly with at least first portions and second portions, said first portions generally corresponding to the outline of said contoured panel;
   the first end of said peeler plate assembly being pivotally and slidably connected to said cam means and capable of movement around the cam means and said second end approximating said labeling site;
   a means for rotating said cam;
   wherein said cam means is rotated such that as a contoured panel moves through said labeling site said label wiper presses said leading edge of said label into contact with said panel, said label wiper and said second end of said peeler plate are subsequently guided in close proximity to the contoured panel without actual contact of said panel between said leading edge and said terminal edge of said label as said first end of said peeler plate assembly moves over said first portion of said cam means while urging said label onto said panel, said label wiper further presses the terminating edge of said label into contact with said panel, the continued rotation of said cam means through said second portion resetting said peeler plate assembly for subsequent labeling as said first end of said peeler plate moves over said second portion of said cam means.

2. The device as recited in claim 1, where said peeler plate assembly further comprises an extension arm at said first end, said extension arm having a first and a second end, said first end pivotally and slidably connected to said cam means and said second connected to a stationary but pivotal applicator rod, said applicator rod in rotational contact with said peeler plate.

3. The device as recited in claim 1 wherein said first portion of said cam means is a concave surface to label concave contoured panels.

4. The device as recited in claim 1 wherein said first portion of said cam means is a convex surface to label convex panels.

5. The device as recited in claim 1 wherein said first portion of said cam means is a planar surface to label planar panels.

6. The device as recited in claim 1 wherein said first portion of said cam means generally corresponds to the outline and shape of said contoured panel to label panels having any combination of convex, concave and planar surfaces.

7. The device as recited in claim 1 wherein said device applies a tension strength to the label being applied during the application.

8. The device as recited in claim 1 wherein the device labels vertically oriented product panels conveyed horizontally past a labeling site.

9. The device as recited in claim 1, wherein, said second portion is generally arcuate in shape so as to effect resetting of said peeler plate assembly.

10. The device as recited in claim 1 wherein one rotation of said cam means directs said peeler plate through the labeling of at least two contoured panels.

11. The device as recited in claim 1 wherein said cam further comprises a base and a cam track mounted thereon and said peeler plate assembly is movably coupled to said cam track by a cam follower.

12. The device as recited in claim 9 wherein said cam track is shaped and dimensioned to correspond to specific contoured panels.

13. The device as recited in claim 9 wherein said rotatable cam track forms an essentially closed geometric configuration.

14. A method for continuous application of labels, having leading and terminating edges, carried on a web onto contoured panels at a labeling site comprising:
   conveying said contoured panels past a labeling site;
   positioning a peeler plate assembly having a first and second end and a peeler tip at said second end, with said second end at said labeling site, said peeler plate having a label wiper fixedly attached to said peeler plate and essentially parallel thereto, said label wiper having a first and a second end portion, said second end portion extending beyond said peeler tip of said peeler plate and angled inward toward the longitudinal axis of said peeler plate so as to direct said labels into contact with said contoured panel, said pressure sensitive labels passing between said peeler plate and said label wiper;
   pivotally and slidably coupling said first end of said peeler plate assembly to a cam means having at least first portions and second portions wherein said first portions generally corresponds to the outline of the contoured panel;
   initiating contact of a leading edge of a label with said contoured panel by said second end of said label wiper as said panel enters said labeling site, without contact of said panel by said peeler plate;
   rotating said cam means such that said first end of said peeler plate is moved over said first portion of said cam means, wherein rotation of said cam means enables said peeler plate assembly to be moved in close proximity to said contoured panel without said peeler plate assembly contacting said panel between said leading edge and said terminal edge of said label while urging said label onto said panel;
   pressing said label into contact with said contoured panel at the terminal edge of said label by said label wiper; and
   resetting said peeler plate assembly for subsequent labeling as said first end of said peeler plate moves over said second portion of said cam means.

15. The method of claim 14, further comprising the steps of:
   resetting said peeler plate assembly for subsequent labeling operations by movement of said first end of said peeler plate assembly over said second portion of said cam means as said cam means is rotated.

16. An improved apparatus for applying pressure sensitive labels to a preselected surface on a plurality of products which move in succession along a path of travel past a labeling site, of the type including a supply means for feeding a label bearing web to said applying means, a means for routing the web over a transport pathway including said labeling site, wherein the improvement comprises:
   a peeler plate assembly having first and second ends and a peeler tip at said second end of said peeler plate assembly;
   a label wiper fixedly attached to said peeler pate and essentially parallel thereto, said label wiper having a first and second end portion, said first end portion of said label wiper extending beyond said peeler tip of said peeler plate and angled inward toward the longitudinal axis of said peeler plate so as to direct said labels into contact with said contoured panel, said pressure sensitive labels passing between said peeler plate and said label wiper;
   a rotating closed loop cam means with at least first portions and second portions, said first portions generally corresponding to the outline of said contoured panel;
   the first end of said peeler plate assembly being pivotally and slidably connected to said cam means and capable of movement around the cam means and said second end approximating said labeling site;
   a means for rotating said cam;
   wherein said cam means is rotated such that as a contoured panel moves through said labeling site said label wiper presses said leading edge of said label into contact with said panel, said label wiper and said second end of said peeler plate are subsequently guided in close proximity to the contoured panel without actual contact of said panel between said leading and said terminating edge of said label as said first end of said peeler plate assembly moves over said first portion of said cam means while urging said label onto said panel, said label wiper further presses the terminating edge of said label into contact with said panel, the continued rotation of said cam means through said second portion resetting said peeler plate assembly for subsequent labeling as said first end of said peeler plate moves over said second portion of said cam means.

* * * * *